United States Patent [19]

Nakata

[11] Patent Number: 4,845,701
[45] Date of Patent: Jul. 4, 1989

[54] OPTICAL DISC PLAYER FOR OPTICALLY REPRODUCING RECORDED INFORMATION ON AN OPTICAL INFORMATION DISC INTO AN RF SIGNAL

[75] Inventor: Junichi Nakata, Tokorozawa, Japan

[73] Assignee: Pioneer Electronic Corporation, Tokyo, Japan

[21] Appl. No.: 84,459

[22] Filed: Aug. 12, 1987

[30] Foreign Application Priority Data

Aug. 29, 1986 [JP] Japan ............... 61-203246

[51] Int. Cl.$^4$ ............................................. G11B 7/00
[52] U.S. Cl. ...................................... 369/120; 369/124
[58] Field of Search ............. 369/120, 122, 43–46, 369/124, 109

[56] References Cited

U.S. PATENT DOCUMENTS

| | | | |
|---|---|---|---|
| 4,025,784 | 5/1977 | Lehureau et al. | 369/46 |
| 4,366,564 | 12/1982 | de Haan et al. | 364/124 |
| 4,539,665 | 9/1985 | Iso et al. | 369/46 |
| 4,541,084 | 9/1985 | Oku et al. | 369/46 |
| 4,542,491 | 9/1985 | Takasayo et al. | 369/46 |
| 4,581,728 | 4/1986 | Nakamura et al. | 369/46 |

FOREIGN PATENT DOCUMENTS 60-23932 2/1985 Japan.

Primary Examiner—Robert L. Richardson
Assistant Examiner—James Tomassini
Attorney, Agent, or Firm—Fleit, Jacobson, Cohn, Price, Holman & Stern

[57] ABSTRACT

In an apparatus for optically reproducing the recorded information, a circuit to reproduce an RF signal is provided. At least a pair of photo sensors are arranged adjacently in a direction parallel with a tangential line of a recording track of an information recording disc. A light beam is irradiated onto the recording surface of the disc and the reflected light from the recording surface is received by these photo sensor. The phases of both output signals of the photo sensors are made coincident by the phase shift means. The resultant output signals having the same phase are added thereby to form the RF signal. For this purpose, the phase difference between both output signals of the photo sensors is detected and either one of phases of the output signals is shifted in accordance with the phase difference detecting output.

3 Claims, 4 Drawing Sheets

OPTICAL DISC PLAYER FOR OPTICALLY REPRODUCING RECORDED INFORMATION ON AN OPTICAL INFORMATION DISC INTO AN RF SIGNAL

BACKGROUND OF THE INVENTION

The present invention relates to an apparatus for optically reproducing the recorded information and, more particularly, to a circuit for reproducing an RF (high frequency) signal in the apparatus for optically reproducing the recorded information.

In the apparatus for optically reproducing the recorded information, the RF signal, a focussing error signal and a tracking error signal are produced on the basis of the reflected light obtained by irradiating a light beam onto the recording surface of an information recording disc (hereinafter, simply referred to as a disc). On the other hand, it has been well known that in order to produce the RF signal and the focussing error signal by a common photo sensing device, what is called a four-split type photo sensing device is used. Namely, the photo sensing surface of this device is divided into four surfaces by a split line in the direction which is parallel with the tangential line of the recording track and by another split line perpendicular to the former split line.

In the RF signal producing circuit using such a four-split type photo sensing device, the light beam for reproduction is focussed onto the recording surface of the disc so as to irradiate as a light beam spot thereto. The reflected light from the recording surface based on the irradiated light beam is led to the four split surfaces of the photo sensing device. The outputs of the surfaces locating on the same side regarding the split line perpendicular to the tangential direction of the track are respectively added to obtain two addition outputs A and B. Further, the addition outputs A and B are added thereby to produce the RF signal.

In the RF signal producing circuit, when the depth d of pit which forms the recording track is smaller than $\lambda/4$ ($\lambda$ denotes a wavelength of the light beam), the addition outputs A and B have the same waveform and there is a constant time difference (phase difference) between them. Therefore, the leading and trailing edges of the addition output (the RF signal) of the outputs A and B are dull. The amplitude of the output waveform when the length of pit is short is smaller by a predetermined level than the amplitude of the output waveform when the length is long. Namely, the attenuated amount of the high frequency characteristic which is caused due to the addition appears in the RF signal.

To prevent such a situation, the same applicant as the present invention has already proposed a circuit such that phase adjusting means for making the phases of both addition outputs A and B coincident is provided, the addition outputs A and B are transmitted through the phase adjusting means, the resultant addition outputs A and B whose phases are coincident are added to form the RF signal, thereby making the leading and trailing edges of the RF signal steep and enabling the reduction of the level of the RF signal to be suppressed (refer to Japanese Utility Model Laid-Open No. 60-23932).

However, such a situation occurs only when the depth d of pit is smaller than $\lambda/4$. When $d=\lambda/4$, no phase difference occurs between both addition outputs A and B. Therefore, according to such a circuit which is constituted so as to always perform the phase adjustment, an unnecessary phase adjustment is also executed even if the pit whose depth d is equal to $\lambda/4$.

SUMMARY OF THE INVENTION

The present invention is made in consideration of such a problem and it is an object of the invention to provide an apparatus for optically reproducing the recorded information having a circuit in which the phase adjustment is performed only when necessary, and the RF signal having the excelent frequency characteristics such that the leading and trailing edges are always steep irrespective of the depth of pit and the amplitude is almost constant independently of the length of pit is obtained.

According to the present invention, there is provided an apparatus for optically reproducing the recorded information in which at least a pair of photo sensing devices are arranged adjacently in the direction parallel with the tangential line of the recording track of the disc and receive the reflected light beam from the recording surface of the disc, the phases of both output signals of these photo sensing devices being made coincident, and the resultant output signals whose phases were equalized being added, thereby producing the RF signal. In this apparatus, the phase difference between both output signals from a pair of photo sensing devices is detected, and either one of phases of the output signals is shifted in accordance with the detection output of the phase difference.

DETAILED DESCRIPTION OF PREFERRED EMBODIMENTS

An embodiment of the present invention will be described in detail hereinbelow with reference to the drawings.

Figure 1:
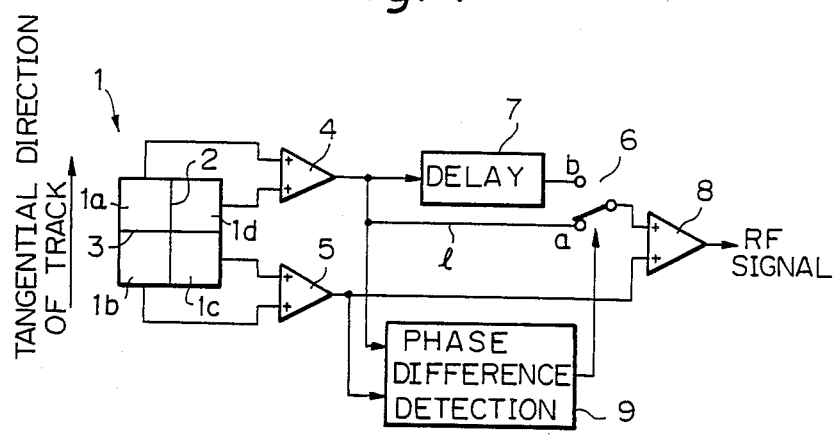
FIG. 1 is a block diagram showing an embodiment of the present invention.

FIG. 1 is a block diagram showing an embodiment of the invention. In the diagram, the photo sensing surface of four-split type photo sensing device 1 is divided into four surfaces by a split line 2 which is parallel with the tangential line of the recording track and by a split line 3 which is perpendicular to the split line 2. With respect to the split line 3 perpendicular to the tangential direction of the track, both outputs of upper devices 1a and 1d in the diagram are added by an adder 4, and both outputs of lower devices 1b and 1c are added by an adder 5. The output of the adder 4 is directly supplied to one input terminal of a change-over switch 6. This output is also transmitted through a delay circuit 7 for phase adjustment and supplied to the other input terminal of the switch 6. The output of the switch 6 and the output of the adder 5 are added to each other by an adder 8, so that an RF signal is picked up.

The outputs of the adders 4 and 5 are also supplied to a phase difference detection circuit 9, so that the phase difference between both outputs is detected by the detection circuit 9. A detection circuit having a well-known contsitution consisting of a combination of a multiplier and a level comparator or the like may be used as the phase difference detection circuit 9.

Figures 2A, 2B, 2C:
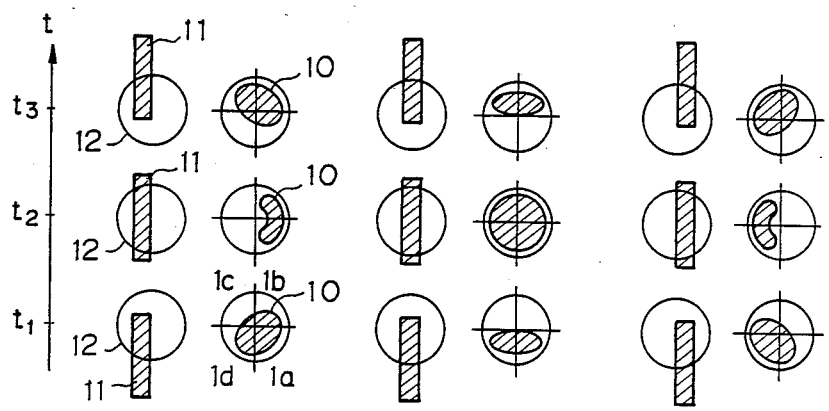
FIG. 2 is a diagram showing the positional relation between the light beam spot for reproduction and the pit when the depth of pit is smaller than $\lambda/4$ and a change in diffractd image of the reflected light on the photo sensing surface in this case.

In such a constitution, when the depth d of pit is smaller than $\lambda/4$, a diffracted image (intensity distribution) 10 of the reflected light on the photo sensing surface of the photo sensing device 1 changes as shown in FIG. 2 with respect to the positional relation between a pit 11 and a light beam spot 12 for reproduction. FIG. 2 (A) is a diagram at times $t_1$ to $t_3$ when the position of the light spot 12 to the pit 11 is slightly deviated to the right in the direction perpendicular to the recording track. FIG. 2 (B) is a diagram at times $t_1$ to $t_3$ when the positions of the pit 11 and light spot 12 are correct. FIG. 2 (C) is a diagram at times $t_1$ to $t_3$ when the position of the light spot 12 to the pit 11 is slightly deviated to the left in the direction perpendicular to the recording track.

Figure 3:
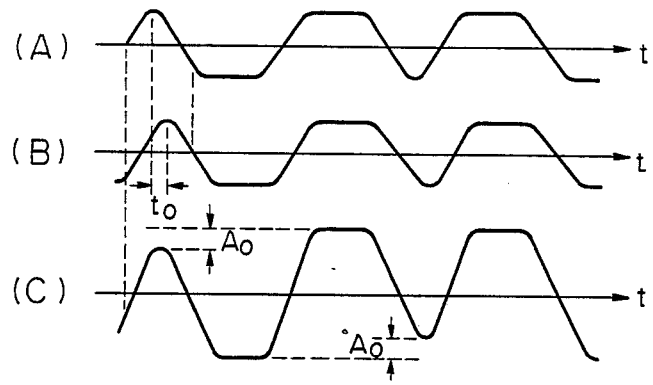
FIG. 3 shows waveform diagrams of both output signals and an RF signal when there is a phase difference between both outputs of adders 4 and 5 in FIG. 1.

Thus, the waveforms of both addition outputs of the adders 4 and 5 are made coincident and there is a phase difference $t_0$ between them as shown in FIG. 3. FIG. 3 (A) shows an output waveform of the adder 4. FIG. 3 (B) shows an output waveform of the adder 5. FIG. 3 (C) shows an addition output waveform when the outputs of the adders 4 and 5 are directly added. When the outputs of waveforms of FIGS. 3 (A) and (B) having the phase difference $t_0$ therebetween are directly added to form the RF signal, the leading and trailing edges of the resultant RF signal are dull as will be seen from the waveform of FIG. 3 (C), and therefore, the amplitude of the output waveform corresponding to a pit of a smaller pit length is smaller by $A_0$ than the amplitude of the output waveform corresponding to a pit of a larger pit length.

When there is the phase difference $t_0$ between both outputs of the adders 4 and 5, the detection circuit 9 detects the phase difference and then turns the switch 6 to the side b. Thus, the output of the adder with a waveform of FIG. 4 (A) is delayed by a delay time $t_0$ through the delay circuit 7, so that the phases of the delayed output with a waveform FIG. 4 (A') and of the output with a waveform FIG. 4 (B) of the adder 5 coincide with each other. Therefore, the RF signal with a waveform of FIG. 4 (C) which is derived by adding both outputs of the adder 8 has a waveform free from any distortions at the leading and trailing edges thereof and any decrease in amplitude or the like.

Figures 5A, 5B, 5C:
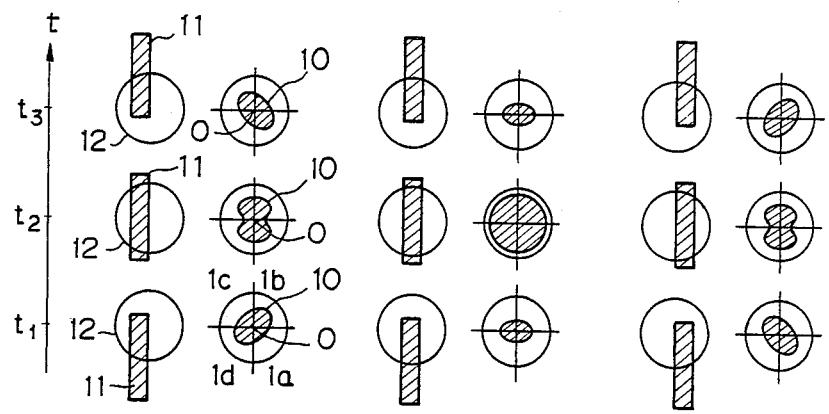
FIG. 5 is a diagram showing the positional relation between the light beam spot and the pit when the depth of pit is equal to $\lambda/4$ and a change in diffracted image of the reflected light on the photo sensing surface in this case.

On the other hand, when the depth d of pit is equal to $\lambda/4$, as shown in FIG. 5, the diffracted image 10 of the reflected light on the photo sensing surface of the photo sensing device 1 is symmetrical with respect to the center 0 of the photo sensing surface irrespective of the positional relation between the pit 11 and the light beam spot 12 for reproduction. Therefore, the phases of both addition outputs of the adders 4 and 5 are coincident. In this case, no detection output is generated from the detection circuit 9 and the switch 6 is turned to the side a. Therefore, the output of the adder 4 is not unnessarily delayed but is directly added to the output of the adder 5 by the adder 8. Thus, similarly to the above case, the led out RF signal has a waveform free from any deteriorations at the leading and trailing edges and any decrease in amplitude or the like.

In the foregoing embodiment, the output of the adder 4 is selectively transmitted through the delay circuit 7 in dependence on he presence or absence of the phase difference between both addition outputs. However, the line l which bypasses the switch 6 and delay circuit 7 can be omitted, the delay time of the delay circuit 7 can be set to two values of 0 and $t_0$, and the delay time (phase adjustment amount) can be also set in accordance with the detection output of the phase difference detection circuit 9.

Figure 6:
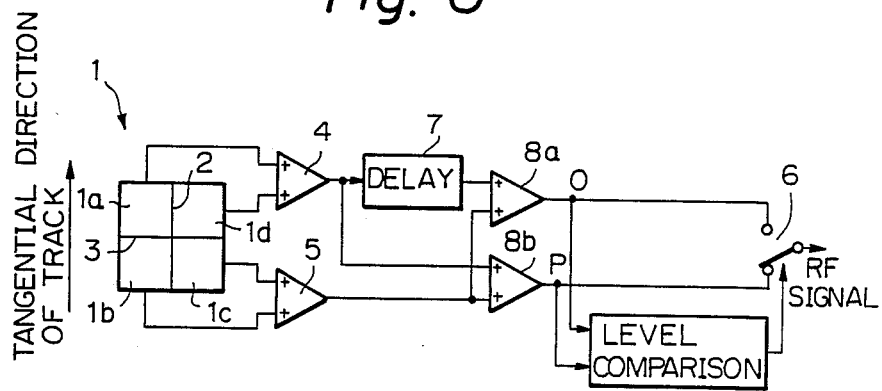
FIG. 6 is a block diagram showing another embodiment of the present invention.

FIG. 6 is a block diagram showing another embodiment of the invention. In FIG. 6, the same parts and components as those shown in FIG. 1 are designated by the same reference numerals. In FIG. 6, the output of the adder 4 is supplied to one input terminal of an adder 8a through the delay circuit 7 and is also directly supplied to one input terminal of an adder 8b. The output of the adder 5 is supplied to the other input terminals of the adders 8a and 8b. Either one of the outputs of the adders 8a and 8b is selectively output by the switch 6 and is led out as an RF signal.

Figure 4:
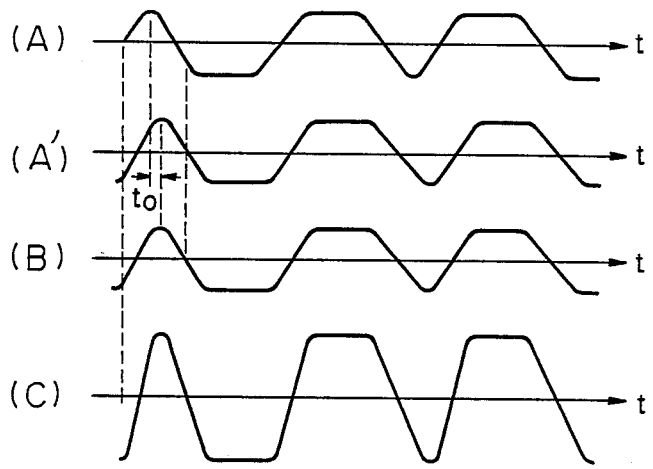
FIG. 4 shows waveform diagram of each output signal and an RF signal when the phases of both outputs signals are made coincident.

The outputs of the adders 8a and 8b are also supplied to a level comparator 20 and the level difference between them is detected by the comparator 20. The level comparator 20 functions as means for detecting the phase difference between both outputs of the adders 8a and 8b. Namely, by reference to the waveforms corresponding to the short pit length in FIGS. 3 and 4, it will be understood that the amplitude of the output signal when there is a phase difference is smaller than the amplitude when there is no phase difference. Therefore, by detecting the level difference, the phase difference between both outputs can be detected. FIGS. 3 and 4 show the waveforms in the case of the digital audio disc. The phase difference can be detected only when the pit length is short. However, in the case of the video disc, the phase difference can be always detected because the video data is recorded by pits having short lengths.

Figure 7:
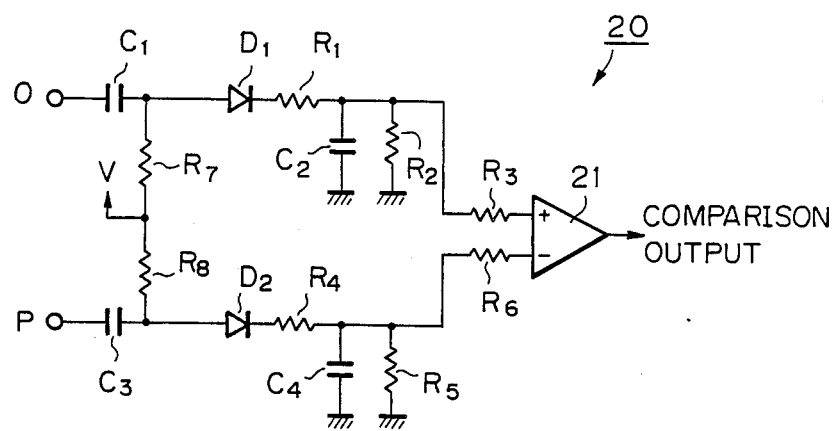
FIG. 7 is a circuit diagram showing an example of a practical constitution of a level comparator in FIG. 6.

The comparator having such a constitution as shown in, e.g., FIG. 7 can be used as the level comparator 20. Namely, the output of the adder 8a which is input through a capacitor $C_1$ is half-wave rectified by a diode $D_1$. The rectified output is transmitted through a resistor $R_1$ and integrated by an integrator consisting of a resistor R and a capacitor $C_2$. Thereafter, the integrated output signal is supplied through a resistor $R_3$ to a non-inverting input teminal of a comaprator 21. On the other hand, the output of the adder 8b which is input through a capacitor $C_3$ is half-wave rectified by a diode $D_2$. The rectified output is transmitted through a resistor $R_4$ and integrated by an integrator consisting of a resistor $R_5$ and a capacitor $C_4$. Thereafter, the integrated output signal is supplied through a resistor $R_6$ to an inverting input terminal of the comparator 21. The output of the cmparator 21 becomes the phase difference detection output. A power source voltage V is applied to each output terminal of the capacitors $C_1$ and $C_3$ through resistors $R_7$ and $R_8$, respectively.

The foregoing embodiments have been described with respect to the case where the four-split type photo sensing device is used. However, it is also possible to use a two-split type photo sensing device such that the photo sensing surface is divided into two parts by only the split line 3 which is perpendicular to the recording track. Further, the split line 3 is not limited to only the straight line. On the other hand, although only one of the addition outputs has been delayed in the embodiments, it is also possible to delay both addition outputs with proper delay times so as to make the phases of both outputs coincide with each other.

As described above, according to the invention, at least a pair of photo sensing devices are arranged adjacently in the directions which are parallel with the tangential line of the recording track of the disc and receive the reflected light from the recording surface of the disc. The phase difference between both output signals from the photo sensing devices is detected. The adjustment amount of the phase adjusting means for making the phases of both output signals coincident is set in accordance with the detection output of the phase difference. Therefore, the RF signal such that the leading and trailing edges are always steep irrespective of the depth of pit and the amplitude is almost constant independently of the length of pit can be produced. Thus, the error ratio in reproduction of the signal can be reduced.

What is claimed is:

1. An optical disc player for optically reproducing recorded information on an optical information disc into an RF signal, said optical disc player comprising:
   a pick-up unit including a photo-emitter for irradiating a single optical beam onto a recording surface of said disc and a pair of photo sensing devices which are arranged closely adjacently in a direction parallel with the tangential line of a recording track on said recording surface each receiving reflected light from said recording surface so as to produce output signals representing the magnitude of said reflected light;
   phase difference detecting means for detecting a phase difference between both output signals from said pair of photo sensing devices;
   phase shift means for shifting at least either one of phases of said output signals in accordance with the detected phase difference so as to reduce the phase difference; and
   adding means for adding said output signals to each other so as to form said RF signal.

2. An apparatus according to claim 1, wherein said phase shift means includes:
   delay means for delaying one of said output signals from said pair of photo sensing devices; and
   switch means for selectively passing therethrough either the delayed output signal or an input signal of said delay means in accordance with the detection output of said phase difference detecting means.

3. An optical disc player according to claim 1, in which either one of said photo-sensing devices includes at least two photo-sensitive elements.

* * * * *